United States Patent [19]

Daunderer et al.

[11] 3,917,211

[45] Nov. 4, 1975

[54] DEVICE FOR VARYING THE VERTICAL SEPARATION AND THE RELATIVE LONGITUDINAL INCLINATION

[75] Inventors: Heinz Daunderer; Hermann Meiller, both of Amberg, Germany

[73] Assignee: Georg Grammer, Germany

[22] Filed: Jan. 16, 1974

[21] Appl. No.: 433,725

[30] Foreign Application Priority Data
Feb. 9, 1973  Germany............................ 2306478

[52] U.S. Cl............................. 248/421; 108/145 X
[51] Int. Cl.² ....................................... F16M 13/00
[58] Field of Search ........... 248/394, 396, 371, 419, 248/421; 297/325, 330, 345–347; 108/7–10, 145

[56] References Cited
UNITED STATES PATENTS

| | | | |
|---|---|---|---|
| 2,070,468 | 2/1937 | Chapman............................ | 108/145 |
| 2,615,499 | 10/1952 | Wallace .......................... | 297/347 X |
| 3,006,594 | 10/1961 | Gruendler....................... | 248/419 X |
| 3,150,898 | 9/1964 | Knudson...................... | 297/347 X |

Primary Examiner—James C. Mitchell
Attorney, Agent, or Firm—Marn & Jangarathis

[57] ABSTRACT

A device for varying the vertical separation and relative inclination of two plate members, especially for the seat of an automotive vehicle, in which the two plate members have tandem pairs of bell crank levers pivotally interconnecting the plate members, the lower plate member having the pivot of the bell crank mounted thereon, and the upper plate member having the end of the one of the arms of the bell crank. The other arm of each bell crank of one of the tandem pairs is interconnected by an adjustment means which is secured to the first plate member. The adjustment means comprises a mechanism for effecting both relative closure and separation of the points of connection of the levers and the adjustment means can cause pivoting of the levers of a tandem pair relative to the lower plate member, whilst maintaining a fixed separation between the points of connection of the levers and adjustment means. Thus, one can raise and lower the upper plate member on which the seat surface is mounted and/or cause tilting of the upper plate member.

14 Claims, 3 Drawing Figures

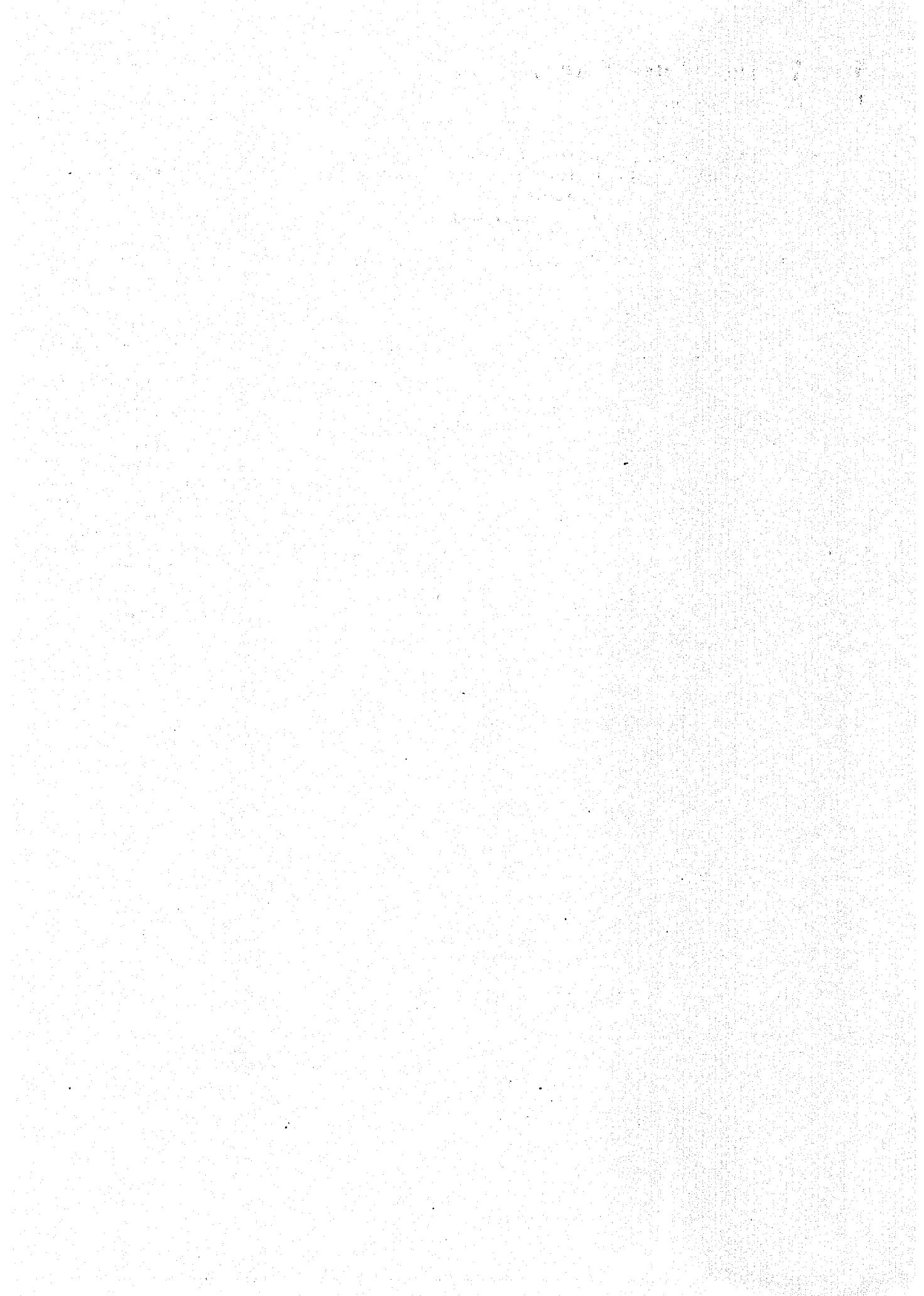

DEVICE FOR VARYING THE VERTICAL SEPARATION AND THE RELATIVE LONGITUDINAL INCLINATION

The invention relates to a device for varying the vertical separation and relative inclination of two plate members, and may form a device for adjusting the sitting surface of seats, especially seats in automotive vehicles.

In the known devices a purely vertical adjustment of the position of the sitting surface requires that two adjustment elements be manipulated simultaneously and to the same extent. Smooth adjustment of both adjustment elements therefore demands some care if a longitudinal tilt once set is not to be altered while the vertical position of the sitting surface is adjusted. A more serious drawback in the case of vehicle seats is that vertical adjustment of the sitting surface can only be carried out when the vehicle is stationary since the driver needs both hands to operate the adjusting mechanism.

According to the present invention I provide a device for varying the vertical separation and relative inclination of two plate members, comprising two such plate members, tandem pairs of levers pivotally interconnecting said plate members, adjustment means connecting the pivotal levers of one said tandem pair and attachment means attaching said adjustment means to said first plate member, said adjustment means comprising a mechanism for effecting (a) relative closure and separation of the points of connection of the levers and adjustment means, and (b) in combination with said attachment means, pivoting of the levers of a tandem pair to a first of the plate members whilst maintaining a fixed separation between the points of connection of the levers and adjustment means.

When such a device is installed for adjusting vehicle seats the driver can readily vary the vertical position of his seat with the use of one hand while the vehicle is moving.

The synchronous pivoting of the pivotal levers provided by the invention for the purpose of altering the inclination has the advantage that the desired change in inclination may be effected much more rapidly than with the known adjustment devices.

There exists a number of possibilities of realising the concept of the invention. In one particularly advantageous embodiment it is contemplated that the adjustment means be a threaded spindle connected to the lower end of one of the pivotal levers of the pair via a lefthand thread and to that of the other pivotal lever of the pair via a righthand thread, that the threaded spindle be supported, via the internal thread of a threaded sleeve so as to be rotatable but adjustably axially with respect to one of the two plate members, the threaded sleeve being selectively rotatable together with or separately from the threaded spindle. This embodiment has the special advantage that virtually only a single adjustment element is present for adjusting both the vertical position and the inclination.

In a second embodiment of the device according to the invention a pressure cylinder supported, preferably between the pivotal levers and one of the plates is provided as adjustment means, the cylinder possessing two piston rods adapted to be driven in opposite directions and acting on the pivotal levers, preferably at the lower ends thereof. By actuating the pistons in one or the other opposite sense the pivotal levers are oppositely pivoted relative to one another and the vertical position of the sitting surface is thereby altered.

In order that the invention may be better understood the following description is given of one preferred embodiment of the invention reference being made to the accompanying drawings in which.

Figure 1:
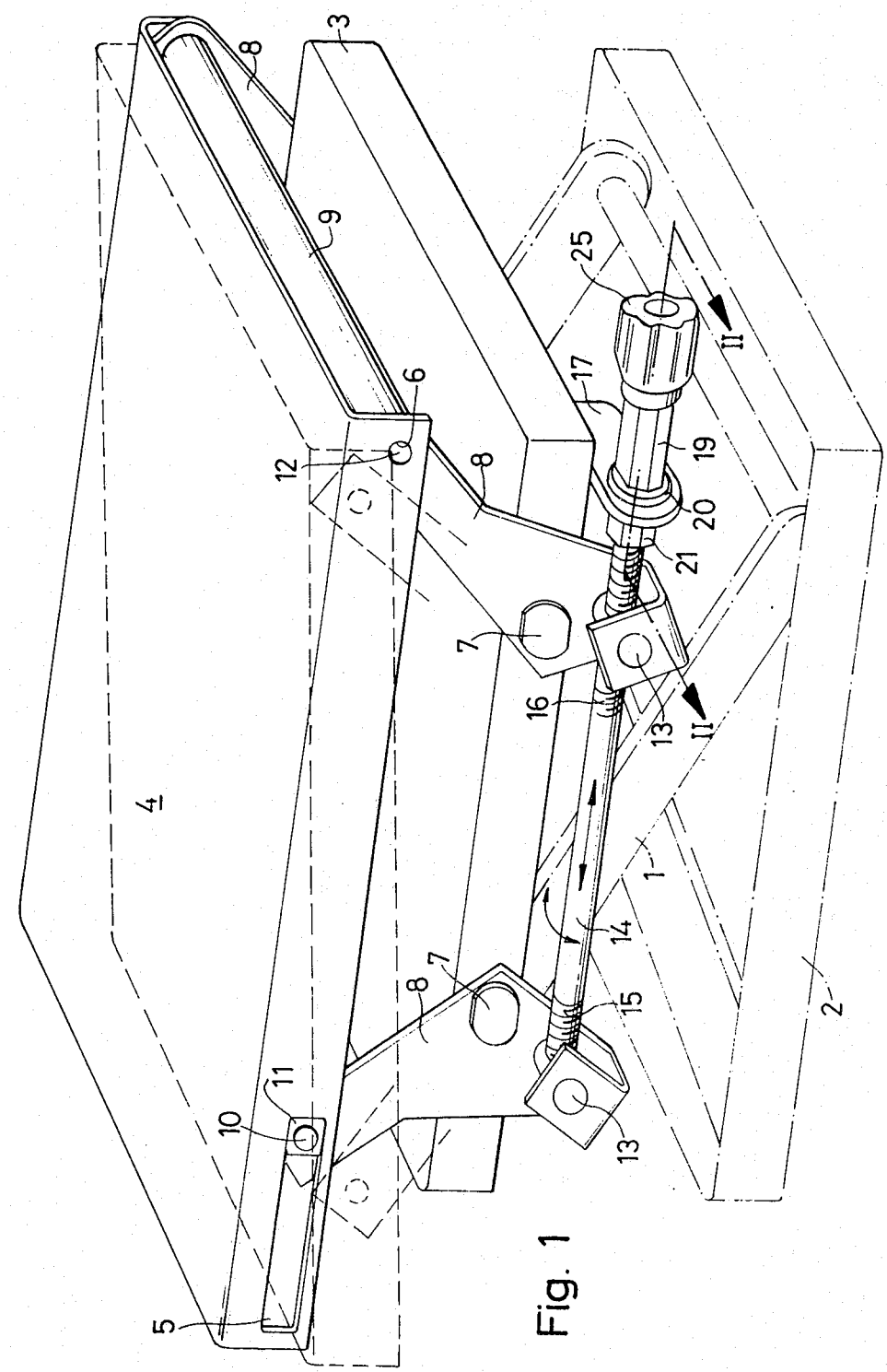
FIG. 1 is a schematic illustration, in perspective, of one embodiment of the invention.

FIG. 1 shows only the essential elements of a device according to the invention and which may be used for adjusting the vertical position and the longitudinal inclination of the seat in an automotive vehicle. Most of those parts which are not essential for the invention, such as sitting surface, back rest and details of the support in the vehicle, have been omitted though a pivotal linkage 1 to a securing framework 2 of the automotive vehicle is indicated in dot-dash lines, the linkage 1 containing the necessary springing and shock absorbing elements.

To the pivotal linkage 1 there is connected a base plate 3 above which a plate 4 is disposed by way of sitting surface carrier. To this plate 4 a seat dish or the like containing the seat cushioning is attached in a manner not shown. The longitudinal sides of the plate 4 are at a downward angle. At the rearward end of the device in each of these angle sections there is a slot 5 which extends parallel to the surface of the plate, while registering apertures 6 are present in the front ends. The connection between the plate 4 and the base plate 3 is established by means of a total of four pivotal levers 8, the two shown in the foreground in FIG. 1 being in the form of bellcranks pivotally mounted at their elbows, by means of bearing pins 7 or the like, to a longitudinal surface of the base plate 3. The background pivotal levers 8, located oppositely to those in the foreground in FIG. 1, are rigidly connected thereto via tubular axles 9.

The upper end of each of the two pivotal levers at the rear (lefthand end as viewed in FIG. 1) of the device is articulated to a slide member 11 via a bearing pin 10, the slide member 11 being secured in the slot 5 so as to be longitudinally movable therein. The upper end of the forward pivotal levers 8 on the other hand is journalled by means of a pin connection 12, in the apertures 6 of the angle sections. While the lower ends of the background pivotal levers 8 are merely articulatedly coupled to the base plate 3 in the axial line of the bearing pins 7, the lower ends of the bellcranks 8 carry transverse shafts 13 which are rotatably journalled in U-shaped trunnion portions of the bellcranks 8. The transverse shafts 13 have registering cross bores provided with threads into which a threaded spindle 14 is screwed. The rearward end of the threaded spindle 14 carries a lefthand thread 15 for example while substantially the front half of the threaded spindle is provided with a righthand thread 16. A bracket 17 is welded to the front end of the base plate 3 and contains a mounting orifice 18 (FIG. 2) registering with the cross bores of the transverse shafts 13. A hexagonally headed threaded sleeve 19 is rotatably mounted in this mounting orifice 18. To this end the threaded sleeve 19 is reduced to a little less than the diameter of the mounting orifice 18 and carries an external thread in the end region of the reduced portion. At either side of the facial rims of the mounting bore 18 a respective washer 20 of bearing metal, brass or the like is fitted on the reduced portion of the threaded sleeve 19 and this mounting is set and fixed by means of a nut 21.

The threaded sleeve 19 further has an internal thread into which the righthand thread 16 of the threaded spindle 14 threadedly engages to such an extent that the leading spindle end projects somewhat beyond the threaded sleeve 19. A hexagonal nut 22 is positioned on this spindle end and secured by means of a cross pin 23. A spacer sleeve 24 is located between the front end of the threaded sleeve 19 and the hexagonal nut 22.

Figure 2:
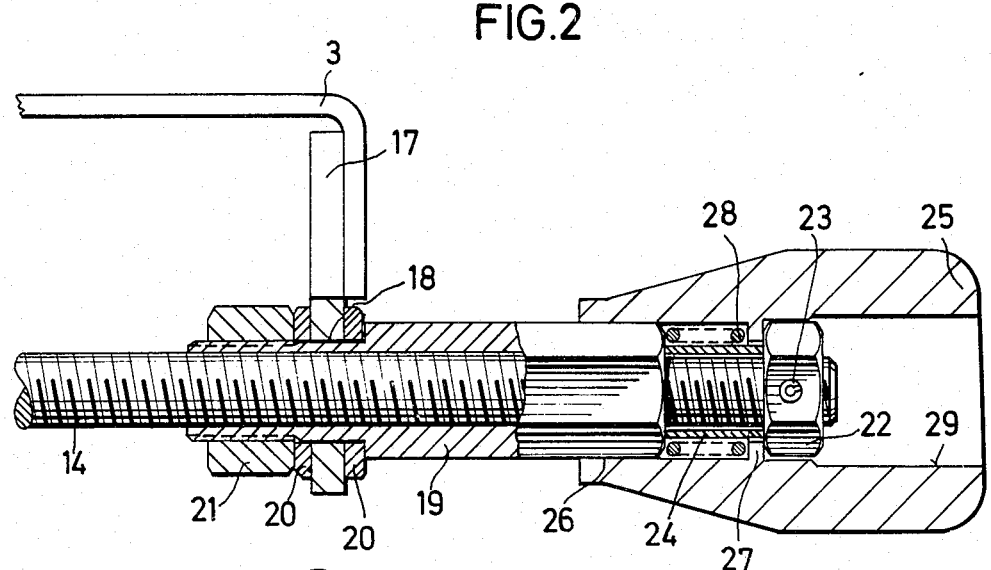
FIG. 2 is a partial longitudinal section taken along line II—II of FIG. 1.

A control grip or rotatable handle 25 having a hexagonal bore 26 is mounted on the front end of the threaded sleeve 19 for axial displacement thereon. Between the end of the sleeve and an internal flange 27 formed in the hexagonal bore 26 there is supported a prestressed compression spring 28 which urges the control grip 25 towards the right, as seen in FIG. 2, and thus urges the internal flange 27 to contact the hexagonal nut 22. In this position the hexagonally faceted nut 22 is situated interiorly of the hexagonal bore 26. Adjoining the portion of the hexagonal bore 26 which is occupied by the nut 22 the internal space of the control grip 25 widens to form a cylindrical bore 29 the diameter whereof is larger than the circle containing the corners of the hexagonal bore 26.

The device according to the invention is operated as follows. When only the vertical position of the plate 4 and thus of the not illustrated sitting surface is to be parallelly adjusted, then the control grip 25 is turned while in the position shown in FIG. 2. Since the hexagonal bore 26 is in positive engagement with both the outer surface of the threaded sleeve 19 and the nut 22, they are both turned simultaneously, so that no relative rotation takes place between the righthand thread 16 and the internal thread of the threaded sleeve 19. Since the bellcranks 8 are of mutually symmetric design and arranged at the base plate 3, their lower ends will be moved towards one another or away from each other dependent on the direction of rotation of grip 25 as a result of the effect of the lefthand thread 15 and the righthand thread 16. The resulting pivoting of the pivotal levers 8 leads to a vertical adjustment of the plate 4, the slide member 11 sliding in the slot 5 of the angle section.

If an alteration of the inclination of the plate 4 is to be carried out, then the control grip 25 is axially urged toward the rear, counter to the action of the compression spring 28, until the nut 22 disengages from the hexagonal bore 26. When now the control grip 25 is rotated while in this displaced position, then only the threaded sleeve 19 rotates in the mounting bore 18 of the bracket 17. The threaded spindle 14 does not turn but as a result of the meshing of the internal threads of sleeve 19 and the threads 16 on the spindle, the spindle is urged axially through the orifice 18. The bellcranks 8 are thereby pivoted forward or rearward without the mutual distance of their lower ends changing and the longitudinal inclination of the plate is thus altered, as is indicated in phantom in FIG. 1.

In accordance with a further desirable embodiment of the invention the adjustment means is again a threaded spindle connected via a lefthand thread to the lower end of one pivotal lever and via a righthand thread to that of the other pivotal lever. In this embodiment however the threaded spindle is rotatably but axially immovably mounted in attachment means of the base plate and the attachment means in turn is adjustable to vary the axial position of the spindle along a guidance of the base plate. The attachment means may be an externally threaded sleeve which is screwed into a bracket of the base plate, a rotatable handle or control grip being provided which can be selectively brought into rotational connection with the threaded spindle or with the threaded sleeve. When the rotatable handle, which may be mounted in a manner similar to that described for the above embodiment, is held in one position, then it is only linked to the threaded spindle. When the handle is turned, then the threaded spindle rotates in the threaded sleeve without moving longitudinally and thus shifts the lower ends of the pivotal levers in opposite sense. Upon turning with the rotatable handle in the other position the threaded sleeve moves relative to the bracket without the threaded spindle rotating and thus displaces the threaded spindle in one or the other direction, dependent on the direction of turning. The lower ends of the pivotal levers are thereby synchronously entrained.

The structural design of this last-mentioned embodiment of the device, which is not illustrated, resembles the illustrated embodiment as to the manner of arrangement of the control grip. But the threaded sleeve of this last-mentioned embodiment has no internal thread and merely serves as radial and axial bearing for the threaded spindle. The axial mounting may be effected by suitable flanges or rings inserted in annular grooves and supported at the end faces of the threaded sleeve. The threaded sleeve, the forward region whereof may also be hexagonally faceted for accomodation of the control grip, on the other hand has an external thread whereby the sleeve can be threadedly engaged in a corresponding threaded bore of the bracket secured to the base plate. The dimensions of the control grip are so chosen that the hexagonal bore of the grip is in engagement only with the threaded sleeve in one terminal position and only with the hexagonal nut of the threaded spindle in the other terminal position. Thus, when the control grip is turned in that condition in which it is positively engaged with the hexagonal nut, then only the threaded spindle is rotated and pivots the bellcranks relative to each other. Because the threaded sleeve remains stationary the spindle is prevented from moving axially. When on the other hand the control grip is turned when in a position in which it is only in engagement with the threaded sleeve, then the threaded sleeve only will be rotated and thus screws through the threaded bore of the bracket. The threaded spindle is thus entrained via the axial mounted at the threaded sleeve so that the bellcranks pivot synchronously.

Figure 3:
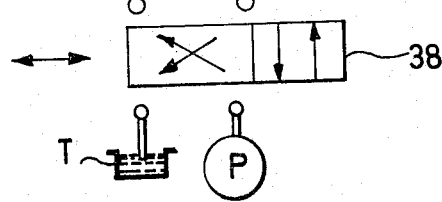
FIG. 3 is a fragmentary view, similar to FIG. 1, of a modified construction.

The embodiment according to FIG. 3 largely resembles that of FIG. 1 like reference numreals being used for like parts. However, instead of the threaded spindle 14 there is here provided a pressure medium cylinder 30 in which are movable two pistons 31 having piston rods 32 oppositely projecting from opposite ends of the cylinder. The piston rods 32 are firmly connected to the transverse shafts 13 which, however, in this embodiment are guided in slots 33 of the pivotal levers 8, so as to be able to follow the pivoting.

The pressure medium cylinder 30 has altogether five connections, i.e. two respective connections a and a' and b and b' at either end and a central connection c. The two end connections a and b jointly lead to a connection line 34 and the central connection leads to a connection line 35. The two end connections a' and b' are connected with respective connection lines 36 and 37.

With the connection lines 34, 35 there is associated a slide valve 38 which can be actuated by a handle (not shown) and which, depending on its position, communicates the line 34 with a pressure medium pump p and the line 35 with a pressureless tank T or vice versa. With the lines 36, 37 there is also associated a slide valve 39 which, depending on its position, communicates the line 36 with the pump P and the line 37 with the pressure-less tank, or vice versa. It is clear that pressurising of, for example the line 35 with pressure medium from pump P will result in the two pistons 31 being moved apart and thus the lower ends of the angle levers 8 will also be moved away from each other. The vertical position of the seat will thus be altered parallel to itself. When, on the other hand, pressure medium is fed to the cylinder 30 via the slide valve 39, then the two pistons 31 move uniformly to one or the other side and leave the distance between the lower ends of the angle levers 8 unaltered. The longitudinal inclination of the seat is thereby adjusted.

We claim:

1. A device for varying the vertical separation and relative inclination of two plate members, comprising in combination:
   a. first and second plate members;
   b. pivotal levers interconnecting said first and second plate members, said levers being mounted in tandem pairs;
   c. adjustment means connecting said pivotal levers at connection points thereof one of said tendem pairs; and
   d. attachment means attaching said adjustment means to said first plate member, said adjustment means comprising a first mechanism for effecting relative closure and separation of the connection points, and a second mechanism operable independently of said first mechanism and in combination with said attachment means for effecting pivoting of the levers of said pair relative to the first plate member whilst maintaining a fixed separation between said connection points.

2. A device as claimed in claim 1, wherein the pivotal levers are pivoted to fixed points on said first plate member, one lever of each pair being in addition pivoted at a fixed location on said second plate member, the other lever of each pair further comprising an engagement surface at its connection with the second plate member, and said second plate member further comprising slot means within which said engagement surface may slide.

3. A device as claimed in claim 1, wherein the pivotal levers are in the form of bell cranks having first and second arms joining at an elbow thereof to the first plate member and being operatively connected by means of the first of said arms to the second plate member and said adjustment means comprising a spindle interconnecting the second arms of the bell cranks of each pair.

4. A device as claimed in claim 1, wherein the adjustment means comprises a spindle, said spindle having formed thereon first and second axially spaced threaded portions, a first of said threaded portions having a left-hand thread and the second threaded portion having a right-hand thread, a first lever of said pair further comprising a threaded orifice for receiving said first threaded portion of the adjustment means, and the other of said pair further comprising a threaded orifice for receiving the second threaded portion of said spindle such that rotation of said spindle will vary the mutual separation of said two threaded orifices.

5. A device as claimed in claim 1 wherein the second mechanism of the adjustment means comprises a threaded shaft, means attaching the threaded shaft between the two levers of said pair with a fixed length of shaft therebetween and a shaft securing arrangement disposed on the shaft and engageable with the attachment means to form therewith a shaft regulating assembly for regulating the axial position of the shaft with respect to the first plate member.

6. A device as claimed in claim 5, wherein the threaded shaft has first and second axially spaced threaded portions, the first of said portions having a left-handed thread and the second portion having a right-handed thread, one lever of said pair being provided with a first threaded orifice with which said first threaded portion of the shaft may engage, and the second lever of said pair being provided with an associated second threaded orifice engageable with the second threaded portion of the shaft.

7. A device as claimed in claim 6, wherein said shaft securing arrangement comprises an internally threaded sleeve mating with the thread on one threaded portion of said shaft and having a first externally threaded end portion dimensioned to pass through the orifice in said attachment means, and a second externally faceted annular end portion dimensioned not to pass through the said orifice, said sleeve being threaded onto the shaft such that a length of said one threaded portion thereof projects entirely through said sleeve and further comprising a nut engaging the externally threaded end portion of the sleeve on the side of the attachment means remote from the faceted portion of the sleeve.

8. A device as claimed in claim 7 and including means for rotating said internally threaded sleeve firstly in register with said shaft, and secondly independently of said shaft.

9. A device as claimed in claim 8 and including a bolt head portion to the length of the threaded portion of the shaft projecting through the threaded sleeve, and wherein the means for rotating the shaft securing arrangement comprises a handle displaceable between a first position in which it engages both the faceted head of the sleeve and the bolt portion of the shaft so as to permit simultaneous rotation of said sleeve and said shaft, and a second position in which it engages with the faceted portion of the sleeve alone so as to permit independent rotation of the sleeve relative to the shaft, and a spring biasing said handle into said first position.

10. A device as claimed in claim 6, wherein said shaft securing arrangement comprises an externally threaded sleeve disposed about said shaft so as to be freely rotatable thereabout but axially secured with respect thereto, and said attachment means further comprising a threaded orifice engageable with the externally threaded sleeve.

11. A device as claimed in claim 10, and including means for rotating firstly said externally threaded sleeve independently of said shaft and secondly said shaft independently of said externally threaded sleeve.

12. A device as claimed in claim 1, wherein said second plate member supports a contoured seat surface for a vehicle.

13. A device for varying the vertical separation and relative inclination of two plate members, comprising in combination;
   a. first and second plate members;
   b. pivotal levers interconnecting said first and second plate members, said levers being mounted in tandem pairs;
   c. adjustment means connecting said pivotal levers of one of said tendem pairs; and
   d. attachment means attaching said adjustment means to said first plate member, the adjustment means comprising a double-acting piston and cylinder arrangement having a cylinder supported by said attachment means adjacent said first plate member, and two pistons having associated piston rods and being drivable in opposition to one another, and means connecting said piston rods to respective ones of said pair of levers, such that by selective operation of said pistons both the vertical separation and relative inclination of said two plate members may be varied.

14. A device as claimed in claim 13, wherein said second plate member supports a contoured seat surface for a vehicle.

* * * * *